US012694101B2

(12) United States Patent
Pooja et al.

(10) Patent No.: US 12,694,101 B2
(45) Date of Patent: Jul. 28, 2026

(54) VIRTUAL CANARY FILES TO MITIGATE RANSOMWARE ATTACKS

(71) Applicant: THALES DIS CPL USA, INC., Austin, TX (US)

(72) Inventors: Fnu Pooja, Austin, TX (US); Corey Allen, Clemmons, NC (US); Rajesh Gupta, Jan Jose, CA (US)

(73) Assignee: THALES DIS CPL USA, INC., Austin, TX (US)

( * ) Notice: Subject to any disclaimer, the term of this patent is extended or adjusted under 35 U.S.C. 154(b) by 264 days.

(21) Appl. No.: 18/522,439

(22) Filed: Nov. 29, 2023

(65) Prior Publication Data

US 2025/0173430 A1 May 29, 2025

(51) Int. Cl.
*G06F 21/00* (2013.01)
*G06F 21/55* (2013.01)
*G06F 21/56* (2013.01)

(52) U.S. Cl.
CPC .......... *G06F 21/554* (2013.01); *G06F 21/565* (2013.01); *G06F 21/566* (2013.01); *G06F 2221/034* (2013.01)

(58) Field of Classification Search
CPC .............. G06F 2221/034; G06F 21/566; G06F 21/565; G06F 21/554
USPC ........................................................ 726/23
See application file for complete search history.

(56) References Cited

U.S. PATENT DOCUMENTS

| | | | |
|---|---|---|---|
| 11,349,855 B1 | 5/2022 | Amit | |
| 2018/0189490 A1* | 7/2018 | Maciejak | .............. G06F 21/566 |
| 2018/0248896 A1 | 8/2018 | Challita | |
| 2019/0109870 A1* | 4/2019 | Bedhapudi | .......... H04L 63/0428 |

(Continued)

FOREIGN PATENT DOCUMENTS

| | | | | |
|---|---|---|---|---|
| CN | 114254318 A | * | 3/2022 | ........... G06F 21/554 |
| KR | 102000369 B1 | | 7/2019 | |
| WO | 2022225508 A1 | | 10/2022 | |

OTHER PUBLICATIONS

International Search Report (PCT/ISA/210) and Written Opinion (PCT/ISA/237) mailed on Feb. 19, 2025 by the European Patent Office as the International Searching Authority for corresponding International Application No. PCT/US2024/056788—[17 pages].

(Continued)

*Primary Examiner* — Josnel Jeudy

(57) ABSTRACT

Provided is a computer agent and method to detect and prevent ransomware attacks early without losing customer data, without polluting the customer's file system or consuming any space on a storage device. The computer agent installs a kernel mode layered file system driver which is attached to encryption level group of a filter manager. With this layered file system filter driver design, it creates virtual canary files in directories which appear like normal files to any user or application though these files will not reside on disk. These virtual canary files are spread as baits across the file system to detect and prevent any malicious attack from any process or application. So that the Virtual Canary Files do not consume a large amount of memory, internal structures representing Virtual Canary Files are placed in virtual memory, but actual contents of the Virtual Canary Files do not reside in virtual memory. Other embodiments disclosed.

13 Claims, 6 Drawing Sheets

10

(56) References Cited

U.S. PATENT DOCUMENTS

| | | | |
|---|---|---|---|
| 2020/0089876 A1* | 3/2020 | Aharoni | G06F 21/554 |
| 2021/0160284 A1* | 5/2021 | Strogov | H04L 63/0245 |
| 2021/0216631 A1* | 7/2021 | Child | G06F 21/564 |
| 2023/0139807 A1* | 5/2023 | Rodriguez | G06F 21/64 |
| | | | 726/26 |

OTHER PUBLICATIONS

Thales—CipherTrust Transparent Encryption—https://www.thalestct.com/wp-content/uploads/2022/09/ciphertrust-transparent-encryption-tct-pb.pdf.
Thales—CipherTrust Data Security Platform—https://cpl.thalesgroup.com/sites/default/files/content/product_briefs/field_document/2023-06/ciphertrust-data-security-platform-pb.pdf.

* cited by examiner

20

Computer
Agent

Key manager    21

Host / Client    22

Kernel Driver    24

Memory    25

Canary File(s)

41

Virtual Canary file names insertion

42

Canary file open

43

Canary file read

Canary Design Flow Overview

40

Figures 4C, 4D:
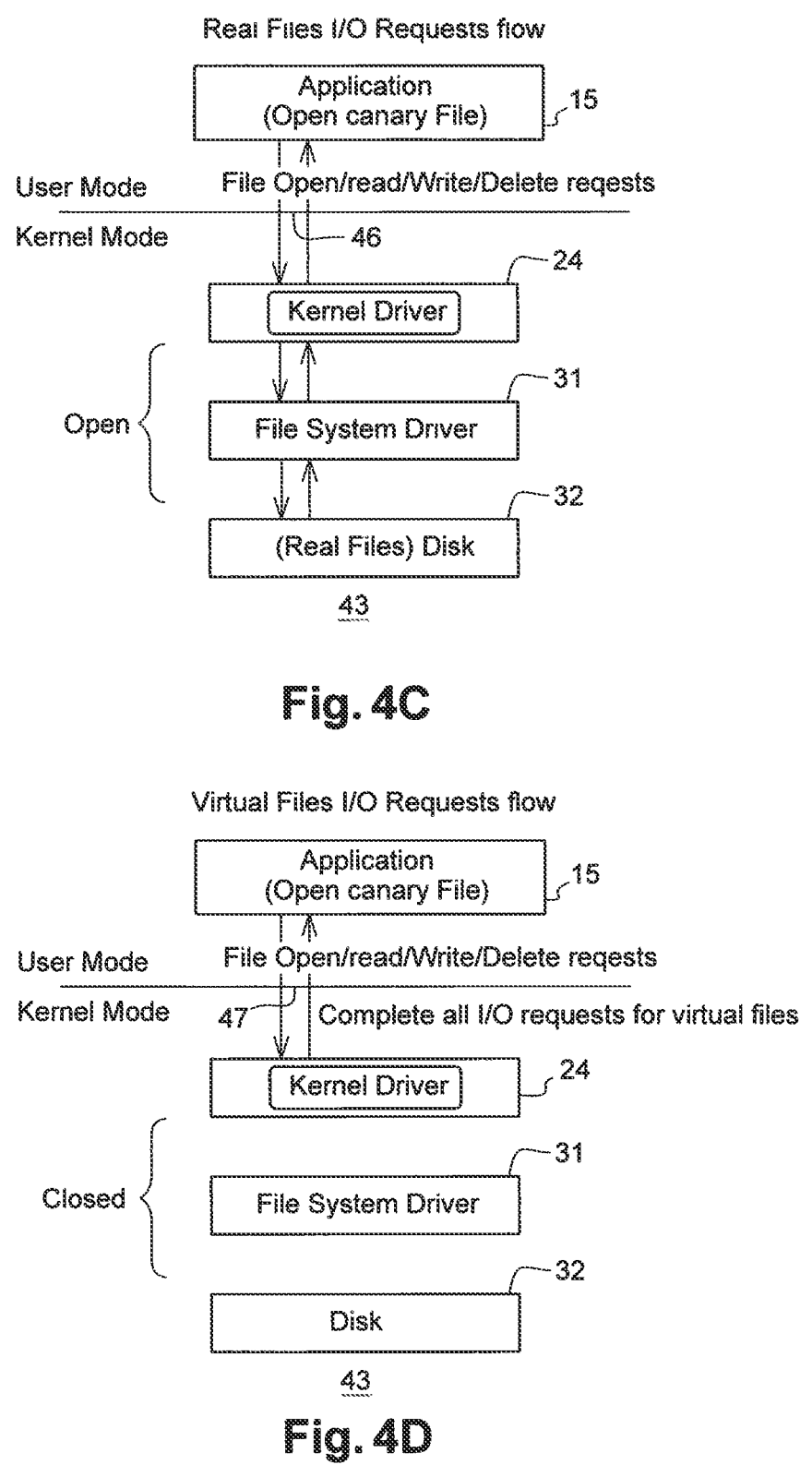

Real Files I/O Requests flow

Application
(Open canary File) ⌐15

User Mode

File Open/read/Write/Delete reqests

Kernel Mode ⌐46

Kernel Driver ⌐24

Open {

File System Driver ⌐31

(Real Files) Disk ⌐32

Virtual Files I/O Requests flow

Application
(Open canary File) ⌐15

User Mode

File Open/read/Write/Delete reqests

Kernel Mode   47⌐   Complete all I/O requests for virtual files

Kernel Driver ⌐24

Closed {

File System Driver ⌐31

Disk ⌐32

Figure 5:
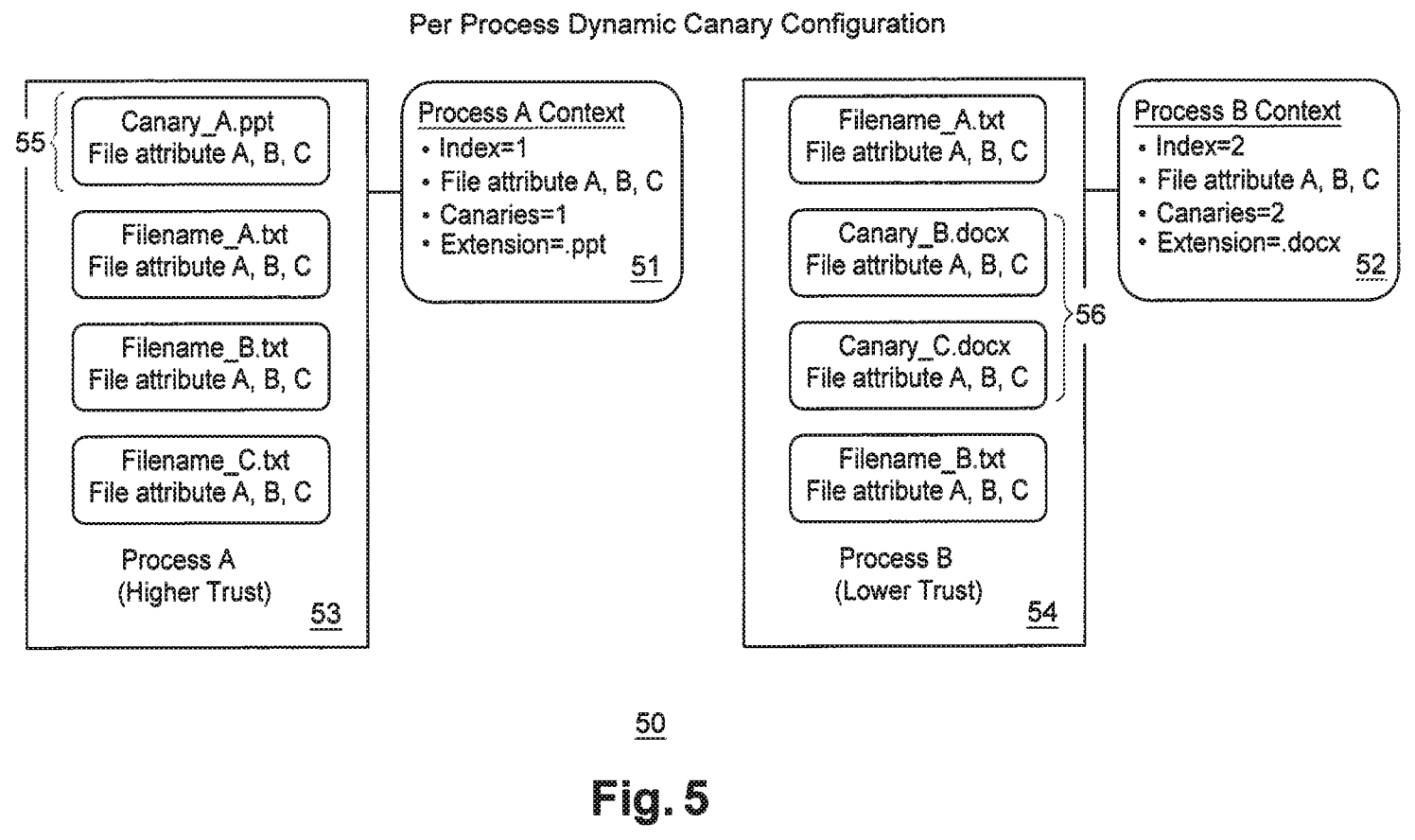

Per Process Dynamic Canary Configuration

Process A Context 51
- Index=1
- File attribute A, B, C
- Canaries=1
- Extension=.ppt

Process A (Higher Trust) 53
- Canary_A.ppt — File attribute A, B, C   55
- Filename_A.txt — File attribute A, B, C
- Filename_B.txt — File attribute A, B, C
- Filename_C.txt — File attribute A, B, C

Process B Context 52
- Index=2
- File attribute A, B, C
- Canaries=2
- Extension=.docx

Process B (Lower Trust) 54
- Filename_A.txt — File attribute A, B, C
- Canary_B.docx — File attribute A, B, C   56
- Canary_C.docx — File attribute A, B, C
- Filename_B.txt — File attribute A, B, C

VIRTUAL CANARY FILES TO MITIGATE RANSOMWARE ATTACKS

TECHNICAL FIELD

The present invention relates generally to software security and malware application monitoring, and more particularly, to detection and mitigation of ransomware attacks.

BACKGROUND

Malware is software that is designed to maliciously cause disruption to a computer, server, client, or computer network. Examples of common malware include viruses, worms, Trojan viruses, spyware, adware, and ransomware. Malware refers to any intrusive software usually developed by hackers and cybercriminals to steal data and damage or destroy computer systems and data. It may gain unauthorized access to information or systems, leak private data, deprive access to information, or otherwise interfere with the user's computer security and privacy. Polymorphic malware is one of the most advanced and sophisticated types of threats, making it a challenge to detect and mitigate. It can modify its encryption algorithms, communication methods, or other characteristics to bypass security measures and successfully encrypt a victim's data Ransomware is one type of malware that employs encryption to hold a victim's information at ransom usually to extort a financial payment from the victim. In this type of attack, a user or organization's critical data is encrypted so that they cannot access files, databases, or applications. It locks up the computer or network and makes the system completely unusable. A ransom is then demanded in return to provide any usable access. Ransomware is often designed to spread across a network and target database and file servers and can quickly paralyze an entire organization. It is a growing threat, generating significant payments to cybercriminals and inflicting serious damage and expenses for businesses and governmental organizations.

Various approaches to dealing with such type of ransomware and attacks have evolved. One is the inclusion of fake computer documents, called canary files, that are placed among real documents in order to assist in the early detection of unauthorized data access, copying or modification of physical files. A canary file portrays a real file that may be attractive to an attacker. Once the attacker attempts to access the canary file, administrators can study the attach behavior.

Canary tokens are different from files in that they are embedded in files and designed to trigger alerts when an attacker accesses them. Canarytokens are resources (directories, files, accounts, etc.) that exist to alert an administrator when they've been accessed, sometimes referred to as Honeytokens. Canarytokens. org is a free resource that allows an end user to run canarytokens for numerous file formats such as excel spreadsheets, PDFs, and even network resources such as DNS records or unique web URLs. Patent Application (US20100122343A1) discloses a detection module is preferably configured to operate under control of the guest operating system virtual machine. When it is determined that a virtualized application has been compromised, the activity that led to that compromise may be recorded and the application killed, where the canary dies, and may then be restored.

Some of the concerns with ransomware canary implementations deal with how best to detect and prevent ransomware attacks early without losing customer data, without polluting the customer's file system or consuming any space on a storage device. One of the bigger technical problems is how to add fake documents randomly among real documents as bait, making these files difficult to detect by malware and malicious applications. Changing the location, size, attributes and contents of the files dynamically is an issue. Also changing these various aspects of the files per user or application is a significant challenge. Canary files are historically physical files created on a storage device with hidden attributes. These files consume space on a storage device when created and can be easily detected by advanced malware attacks because of physical presence. Although, trusted applications, or authenticated users, can view canary files on a storage device, a proper cleanup of canary files poses a problem when a solution is no longer needed. Moreover, physical canary files do not have full control over the file system enumeration process or changing the behavior of enumeration dynamically.

Patent (KR102000369B1) provides a method for ransomware detection, computer readable medium for performing the method and ransomware detection system. Patent Application (US20220092181A1) detects one of, a modification of a shadow copy of a personal user file, a modification of a personal user canary file, modifications of related personal user files, and a known malicious attribute in a recently modified personal user file. Patent (WO2022225508A1) discloses means for prevention and remediation of malware based on selective presentation of files to processes. These solutions however use the physical file with hidden attributes as an implementation strategy.

All of the subject matter discussed in this Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

Provided is a computer agent and method to detect and prevent ransomware attacks early without losing customer data, without polluting the customer's file system or consuming any space on a storage device. The computer agent installs a kernel mode layered file system driver which is attached to encryption level group of a filter manager. With this layered file system filter driver design, virtual canary files are created in directories which appear like normal files to any user or application, though these files will not reside on disk. These virtual canary files are spread as baits across the file system to detect and prevent any malicious attack from any process or application.

The computer agent prevents malicious processes from encrypting or destroying sensitive data, stops exfiltration of sensitive data and protects data from various Advanced Persistent Threats (APT), ransomware, and malicious scripts attacks. Included also is a Ransomware Protection (RWP) module that analyzes data access at a specified guard point in real time and presents a ransomware risk score. It calculates an entropy value of data to determine if a potentially malicious application is encrypting, destroying, or stealing data. During live analysis, it can also learn behavior of ransomware, and revise the risk score where there is a risk that sensitive files may be encrypted or destroyed by the attack. This additionally prevents any files from being encrypted or destroyed by an attack during live analysis. This enhancement ensures that no data is lost while live data analysis is in progress, with the goal of achieving zero data loss.

In one embodiment a method to detect and mitigate ransomware attacks is provided by a Kernel Driver situated between a File System Driver and an Application. A File System Driver opens, reads and writes Real Physical Files to a Hard Disk. The Kernel driver responds to file access requests to the Hard Disk by the Application. It dynamically creates Virtual Canary Files in a memory that is separate from the Hard Disk responsive to the file access requests. It controls file system operations, including I/O events for the reading and writing, to the Virtual Canary Files to dynamically detect whether the Application is ransomware, and mitigate ransoming of the Real Physical Files, without sending file access requests to the storage device. The ransomware attacks are detected early without losing customer data, without polluting the customer's file system or consuming additional space on a storage device of the Hard Disk. It can be deployed within a Computer Agent or installed to execute on a system with infrastructure components for Big Data, Containers, Cloud, Databases and File Servers.

In some embodiments, the Kernel Driver is hooked into the File System Driver using a Layered File System (LFS) model that virtualizes file properties of the Virtual Canary Files to filter a directory query, intercept a filename list from the directory query, and dynamically add Virtual Canary Files to the filename list. The kernel driver creates in-memory structures as internal structures in virtual memory representing Virtual Canary Files that do reside, but actual contents of the Virtual Canary Files do not reside in virtual memory, so that the Virtual Canary Files do not consume a large amount of memory.

In another embodiment a Computer Agent (20) is provided to detect and mitigate ransomware attacks, configured to perform on one or more processors and memory coupled to the one or more processors, wherein the memory includes one or more partitions and computer instructions which when executed by the one or more processors causes the one or more processors to perform operations. Here, a Hard Disk (32) stores Real Physical Files. A File System Driver (31) is provided for opening, reading and writing the Real Physical Files to the Hard Disk (32). A Kernel Driver (24) is situated between the File System Driver and an Application (15) for responding to file access requests to the Hard Disk by the Application (15), and dynamically creating Virtual Canary Files in a memory (25) that is separate from the Hard Disk (32) responsive to the file access requests. It controls file system operations (46, 47), including I/O events for the reading and writing, to the Virtual Canary Files to dynamically detect whether the Application (15) is ransomware, and mitigate ransoming of the Real Physical Files, without sending file access requests to the storage device. In this way, ransomware attacks are detected early without losing customer data, without polluting the customer's file system or consuming additional space on a storage device of the Hard Disk. The Computer Agent can be deployed or installed to execute on one among a system 10 with infrastructure components 30 for Big Data, Containers, Cloud, Databases and File Servers. In some embodiments, the Kernel Driver 24 is hooked into the File System Driver 31 using a Layered File System (LFS) model that virtualizes file properties of the Virtual Canary Files to filter a directory query, intercept a filename list from the directory query, and dynamically add Virtual Canary Files to the filename list.

In some embodiments the step of controlling file system operations (46, 47) comprises: querying attributes of the Real Physical Files in a Folder Directory represented by the Hard Disk; mimicking the attributes (51, 52) of the Real Physical Files to the Virtual Canary Files in the memory (25); creating in-memory structures (26, 27, 28) that represent the Virtual Canary Files and corresponding attributes as Real Physical Files in the Hard Disk (32) to the Application (15); and dynamically changing the attributes (51, 52) of the Virtual Canary Files by way of the in-memory structures in real-time to target ransomware at run-time. The attributes (51, 52) of the Virtual Canary Files are selected from one or more among a name, size, extension, and data or other property or characteristic of the Real Physical Files.

In some embodiments the Kernel Driver via the Layered File System (LFS) model in kernel mode controls (46, 47) file open, read, write and delete requests so as to present the Virtual Canary Files (55, 56) as real documents amongst other physical real files of a Process (A, B) to the Application (15) responsive to the Application enumerating a file system of the Hard Disk.

In some embodiments the Kernel Driver via the Layered File System (LFS) in kernel mode controls enumeration behavior of the file system of the Hard Disk (32) and inserts the Virtual Canary Files (55, 56) at random locations in the Folder Directory amongst other physical real files of a Process (A, B).

In some embodiments the Kernel Driver via the Layered File System (LFS) controls various virtualized attributes (51, 52) of the Virtual Canary Files (55, 56) presented as real documents amongst other physical real files of a Process (A, B) responsive to detecting: a type of malware attack associated with the Application (15); and a user trying to access the real documents and other physical real files.

In some embodiments the Kernel Driver controls various attributes (51, 52) of the real documents responsive to identifying: a perceived trust level (53, 54) of a process associated with the Application (15), wherein the Kernel Driver hides or makes visible Virtual Canary Files (55, 56) according to the perceived trust level (53, 54)

In some embodiments the Kernel Driver dynamically disables and enables the Virtual Canary Files (55, 56) on a per-process basis (50), such that the Virtual Canary Files differ between applications, threads and processes with respect to their location, property, size, content, or characteristics.

In some embodiments the Kernel Driver creates more Virtual Canary Files (56) in real-time upon detection of ransomware activities, thereby trapping ransomware exploits and mitigating access to the Real Physical Files.

In some embodiments the Kernel Drivers changes one among a location, property, size, content, characteristic or attribute (51, 52) of a Canary File (55, 56) and uses an artificial intelligence module (270) or generative artificial intelligence module to learn a behavior of the ransomware.

In some embodiments the Kernel Driver writes data with predetermined patterns at known write offsets in the Virtual Canary Files, and upon detecting a data overwrite at the offset, triggers a ransomware event, whereby the Kernel Driver dynamically changes one or more among: how many Virtual Canary Files are created, sequencing order for an enumeration process of the Virtual Canary Files;

attributes (51, 52) of Virtual Canary Files, including one or more among a name, size, label, visible type, a hidden type, and data therein; and placement of Virtual Canary Files at random locations in the memory.

In some embodiments the in-memory structures are internal structures representing Virtual Canary Files that do reside in virtual memory, though actual contents of the Virtual Canary Files do not reside in virtual memory, such that the Virtual Canary Files do not consume a large amount of memory.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 4C is a sequence diagram for architecture components of FIG. 3 depicting steps of a trusted application associated with an Input/Output request for real physical files in accordance with embodiments;

FIG. 4D is a sequence diagram for architecture components of FIG. 3 depicting steps of an untrusted application associated with an Input/Output request for virtual canary files in accordance with embodiments;

FIG. 5 depicts examples of dynamic modification and configuration of virtual canary files in memory on a per process basis in response to an application reading file data in accordance with embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
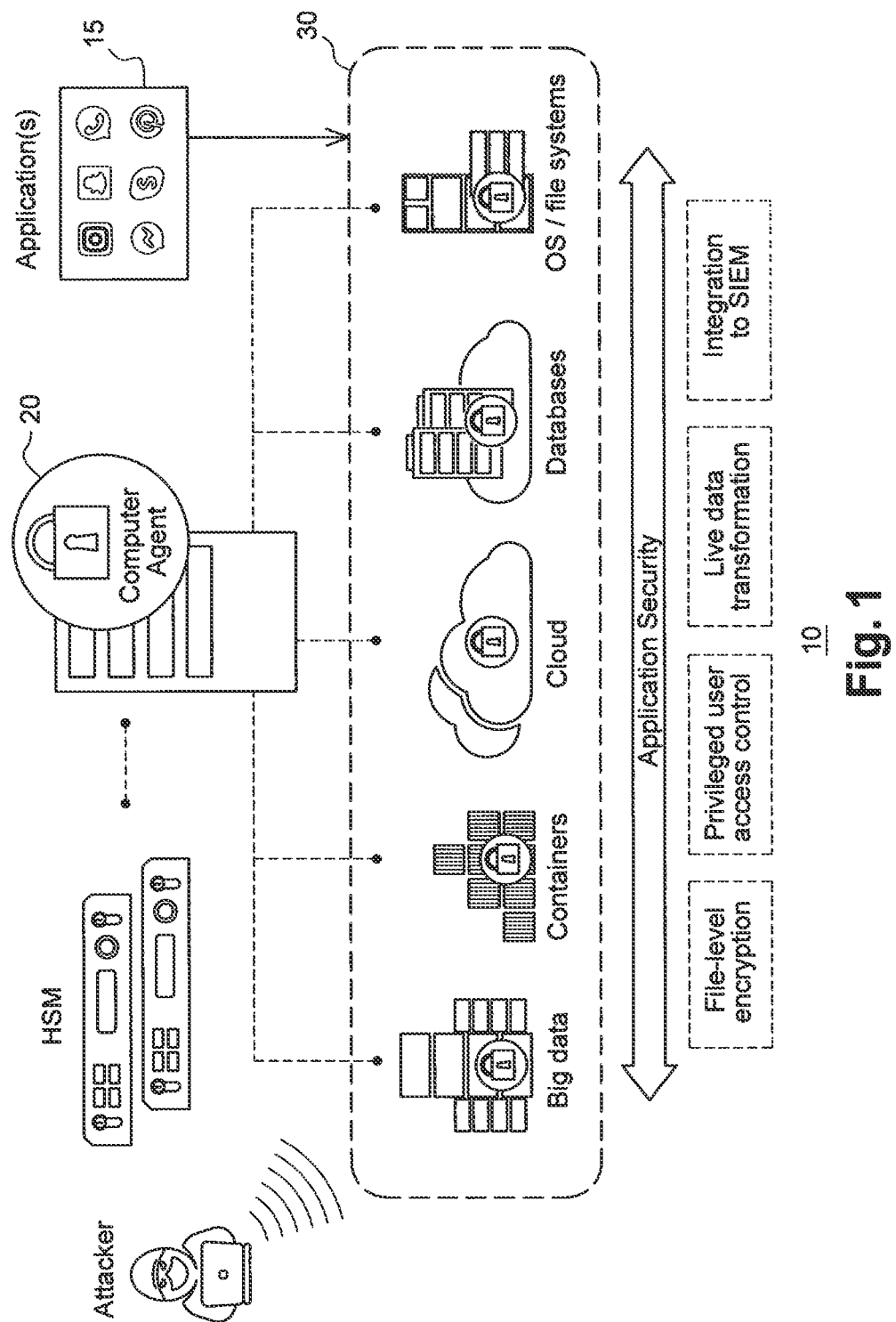
FIG. 1 depicts a data-centric system for safeguarding and securing data, with a Computer Agent to detect and mitigate ransomware attacks in accordance with embodiments.

Referring to FIG. 1A a data-centric system 10 is shown for safeguarding and securing data as it moves from networks to applications and the cloud. The system 10 integrates centralized key management with data protection and granular access controls. It discovers and classifies sensitive data, combat external threats, guard against insider abuse, and establish persistent controls, even when data is stored in the cloud or in any external provider's infrastructure for on-prem and cloud-based data. In support of key lifecycle management, hardware and virtual appliances may be leveraged, which are communicatively coupled to system components. The Hardware Security Module (HSM) is one exemplary physical device to provide secure management of sensitive data, such as keys, which can be configured as a root of trust for the system 10 and for verifying chains of key encryption keys.

One component is the Computer Agent 20, which delivers data-at-rest encryption, privileged user access controls and detailed data access audit logging to reduce security risk and decrease the number of resources required to maintain strong data security. The Computer Agent 20 can be deployed or installed to execute within major infrastructure components 30 in order to secure sensitive data across changing environments and increasing threats, for example, Big Data, Containers, Cloud, Databases and Operating System (OS) File Servers. This is necessary because the typical enterprise today uses multiple IaaS or PaaS providers, along with numerous SaaS applications, big data environments, container technologies, and their own internal virtual environments. Among other security features and data protection services, the Computer Agent 20 provides ransomware protection across one or more of these infrastructure components 30, each of which hosts or runs applications 15, whereby it monitors behaviors, watching for suspicious activities from attackers, and blocks processes when ransomware indicators are detected. The applications 15 may be local user applications such as word processing programs, spreadsheet programs, and collaboration tools, or endpoint management applications and administrative programs executing on any of components 30, or any other type of computer or server-based application. These applications 15 can run within virtual machines, containers, databases, files systems and within the cloud.

Using behavior monitoring and data analytics, in conjunction with malware signature databases or independent of it, Computer Agent 20 protects the infrastructure components 30 and related services from malicious applications 15 and zero-day attacks. It can do this even when disconnected from a network. It allows organizations to rapidly discover and classify data based on sensitivity, vulnerability, and risk profiles and pro-actively protect at-risk data using encryption and access controls. As explained ahead, in accordance with the inventive embodiments herein, Computer Agent 20 can especially detect and mitigate ransomware attacks occurring on, or via, one or more applications 15 in real-time as they occur, and it can do so early in response time without losing customer data, without polluting the customer's file system or consuming any space on a storage device as would occur with typical use of physical canary files.

Figure 2:
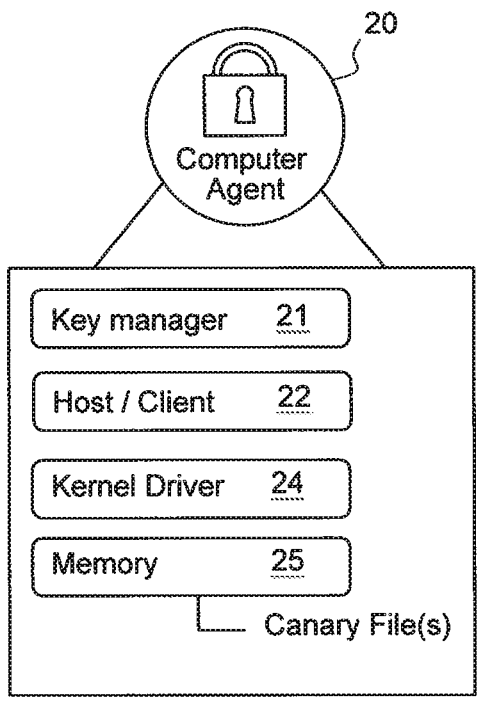
FIG. 2 depicts exemplary components of the Computer Agent for producing virtual canary files in accordance with some embodiments.

FIG. 2 depicts exemplary components of the Computer Agent 20 in accordance with some embodiments. Notably, it may include more or less than the components shown with additional features. The Computer Agent 20 includes software is installed on a physical or virtual machine, computer, servers or other components 30, in order to encrypt and protect the data on that machine. After installation on the machine, it protects any number of devices or directories on that machine, for example, hard drives, discs, folders, file systems and so on. It is operable on Windows, Linux, and AIX platforms, and can be used in physical, virtual, cloud, container, and big data environments, regardless of the underlying storage technology. Various licensing models and packages are available with the Computer Agent 20.

Here, the Computer Agent 20 comprises a Key Manager 21, a Host/Client 22, a Kernel Driver 24 and a Memory 25. The Key Manager 21 is an appliance that stores and manages data encryption keys, data access policies, administrative domains, and administrator profiles. The host and client 22 are used interchangeably to refer to the physical or virtual machine on which the Computer Agent 20 is installed as described above. The Computer Agent 20 controls access to, and monitors changes in this device and directory, for example, encrypting new or changed information as needed, and oversees and enforces the data policy sent to it by the key manager.

The Kernel Driver 24 is a piece of software that enables communication between an operating system (OS) and specific hardware devices, for example the OS of a virtual machine of a component 30 on which the Computer Agent 20 executes in accordance with its data protection and encryption policy. The Memory 25 is system memory, such as physical RAM or even virtual memory, which is separate from a storage device, such as a hard drive or disc. The Memory 25 provides for system storage including the cache of system applications 15, for example, instructions and data the machine needs to execute programs and processes. Canary files are created in memory 25 dynamically. Virtual files are created in a directory of the memory 25 which looks like normal "physical" files to any user or application, but these "virtual" files will not reside on a physical disk. These virtual canary files will be spread as "baits" across file system; to detect and prevent any malicious attack from any process or application 15.

Here, the term "physical" canary files refer to actual data files that reside on a hard disk, hard drive, storage device, solid state, flash or other non-volatile memory. In contrast, a "virtual" canary file is one that consists only of defining structures that reside in memory 25, for example, system memory, RAM or other volatile memory. In either case, canary files are perceived as being implemented within a layered file system (LFS) filter driver design. The canary files consist of structures in memory which define their attributes names and locations which can be presented to the user in such a way to provide the illusion of a real physical file.

The combination of the Kernel Driver 24 with the layered file system (LFS) driver for detecting ransomware via canary files is what makes this solution unique and powerful. This is because implementing "virtual memory only" files, for example, in Windows, is actually very difficult, and although techniques such as redirection (making one physical file appear in multiple locations) or use of a Ram disk, which would make a separate volume that lives in memory, they are not suitable for, or capable of, interleaving virtual files with other "real" physical files, which is necessary for Canary files. This modeling of the Kernel Driver 24 with an LFS can also be referred to as an "isolation model", and it allows the file properties, in actual practice, actually virtual.

The ability of the Kernel Driver 24 with the LFS to change file properties at will is unique and useful in a couple of ways. Our research evaluated and tested different ransomware and our findings revealed that some ransomware apps begin by encrypting the largest file in a directory first. Thus, the Kernel Driver 24 with LFS for dynamic use of canary files can give an attacker the illusion that a canary is the largest file, thereby becoming a potential first target, or vicitim, of Ransomware. And, it does so without polluting the hard disk with extraneous data or other real physical canary files.

The Kernel Driver with the LFS (hereinafter "Kernel Driver") changes the file name dynamically, thereby allowing it to place the virtual canary file in different places in the directory, for example, at a first, middle and end location therein. This is advantageous because our research has also found that certain ransomware applications target the middle location of a directory to begin encrypting files. Similarly, it can also dynamically change the name of the canary if a file is deleted, this way the Canary still blends in with the other files. That is, if a file is deleted it can still place our canaries alphabetically so that they appear first middle or last. For example, if our canary name is based on a certain filename and that canary file is deleted, it can generate a new name in the next directory query based on other names of files next to that certain filename, and it can do this not only alphabetically, but also based on size, permissions, or other file characteristics. And, if a canary is deleted it will mark the process as malicious.

Ransomware behavior is very dynamic in nature and it can use unknown patterns to exploit the filesystem. Our research, through much ransomware testing, in order to assess and model the attacker's modus operandi, has examined attack patterns of 20+ ransomware types. Our findings have established a measurable relationship (model) between attack patterns and file variables like file attributes, file size, data type, directory placement etc. The measures of this relationship are dynamic, and accordingly, the model is reproduced, by way of the Kernel Driver 24 (with the LFS), to dynamically modify canary file attributes during run-time, which in effect, targets ransomware based on its behavior during its execution. Moreover, this dynamicity is best achieved at run time when canary files are based on real files that are already present. This is done to preferably poise the canary file as potential targets, or victims, of the ransomware, thereby preventing the attacks by being the first victims in file system.

Our research has also found that some ransomwares start writing garbage data in files starting from a first index in the directory structure, some start from middle location in directory and some starts from last file in directory and some target big files in directory. So, Kernel Driver 24 will place canaries in first, middle, end index and filesize of canary will be greater than any real file in that directory and with known data so that when ransomware tries to write in that canary placed at either location in directory, it will be caught by the LFS driver. And, any further file operation by that ransomware process will be prevented by LFS driver which will eventually protect all real precious files from attack. In short, the canaries are analagous to first front line soldiers, for instance, whom will be attacked, raise an alarm and thereby prevent further attacks.

Consider an example, where an attacker using ransomware probes and then and then finds and accesses a storage device. The attacker then enumerates the device, and sees a drive with files as shown below under Directory Enumeration. The result and the presented files that the attacker sees are actual real physical files that are present on disc. Because the Kernel Driver 24 is hooked into the file system driver 31, it can filter the directory query and intercept the directly/filename list above in the LFS kernel driver. It then add its own "virtual canary names" to this list before returning the list to the user, which could be a malicious attacker, or normal user. It creates the canary names based on the names in this list. It should be noted that at this time it doesn't yet know yet if the process is malicious or not. Also, it does know if the process is on an allow list, but if so, it will not add the canary names to a process in an allow list; namely, a trusted process. Here also, it will present and show the canary names during the enumeration responsive to the query. It will add Canary files to this list and use the characteristics of the "real file" list, since it does not yet know if this is an attacker yet or not. At the time of the directory query, it can also place the canaries at certain locations in the directory, for example, at a start, middle, or end.

| Directory Enumeration: | | |
|---|---|---|
| Drive | Filename | Attribute (size) |
| C:/ | File1.doc | 1 MB File2.ppt 2 MB File3. doc 5 MB |

Notably, the canary files, including attributes, are virtual; they are not real. For example, a virtual canary file showing a size 5 MB does not actually take 5 MB of memory; that is, the canary file is not really 5 MB of data. The kernel driver does not allocate 5 MB of data. Rather, the size attribute of 5 MB is merely an artificial size leading the ransomware attacker to believe the file has data. The Computer Agent and associated kernel driver do not actually store data in memory reflected by the file size, but rather, simply stores the canary attributes and names and some internal structures in memory. For example, 4 k file does not take up 4 k of memory. It doesn't store file data anywhere, instead it generates just enough random data to satisfy the user I/O request. This applies to the other canary file attributes as well. For example, an attribute for read/write access is not an actual permission/privilege to stored data, because, no file content is actually stored. Rather, the access is virtual so as to lead the ransomware attacker to believe they have read/write permissions.

The Computer Agent 20 filters (hooks) the directory query, thereby allowing it to insert Canary files into the directory query list before the user gets the list back from the kernel. It places the canaries during the directory query, which allows for intentional placement of the Canary at a specific location in the directory query list. Start, middle and end are merely examples of canary locations. Once canaries are inserted into the list, it monitors what the attacker does with the Canary. And, this is based on the premise that no person, device or system should know or care about the canary files, since they were synthetically introduced merely as bait. Thus, a process should not be writing to the canary or performing destructive operations on it. Also, canary locations, sizes, and other file attributes can be dynamically configured based on what is learned about ransomware attacks, which could also differ on a per process basis.

The Computer Agent 20 tries its best to make the Canary the first victim. By placing Canary files at start, middle and end and by using a strategic name, it has a good chance of being the first victim. If the Canary file is "written" to, or if a destructive operation occurs on the Canary (e.g., delete, rename or truncate) the Computer Agent 20 will mark the process as malicious. Our research has shown, that the dynamic and strategic placement of the canary during run-time greatly reduces data loss. And, in the case that the ransomware starts with the first file it selects, for example, one it intends to encrypt and ransom, there is zero data loss.

Figure 3:
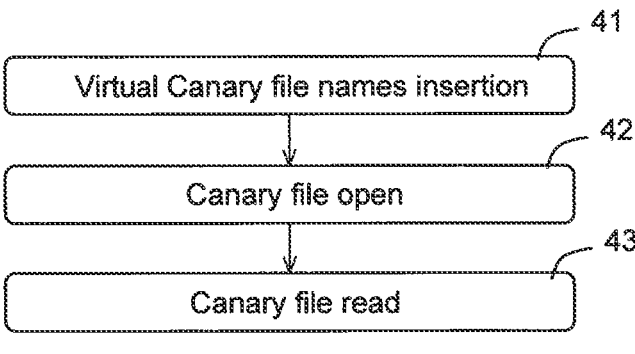
FIG. 3 presents a canary design architecture for producing canary files as virtual files in accordance with some embodiments.

FIG. 3 provides an overview of a canary design architecture 40 in accordance with some embodiments. There are 3 major use cases where the Kernel Driver 24 will release virtual canary files to help detect ransomware exploits. In a first use-case, the Kernel Driver 24 monitors access to these canary files to detect and prevent earliest any ransomware like behavior on live system and this does not require any data analysis of real user files. In a second use-case, the Kernel Driver 24 monitors access to existing canary files, and upon detection of malicious activity thereon, it creates and releases additional virtual canary files to create an attractive first target for ransomware processes to first attack. This technique of spawning of additional canary files provides the benefit of zero loss to business-critical data. In a third use-case, the Kernel Driver 24 monitors access to these canary files to detect any malicious attacks without calculating file heuristics, because early ransomware attacks don't tend to encrypt file data, rather they scour and enumerate file systems looking for vulnerabilities.

These owned virtual canary files offer multiple benefits over other techniques to prevent ransomware attacks. A first benefit is easy cleanup, since virtual files do not exist on disk at all and do not consume any disk space. It should also be noted that although the internal structures representing the Virtual Files do reside in virtual memory, the file's contents do not, therefore the Virtual Files do not consume a large amount of memory. In this case, the Kernel Driver 24 removes these files, and they disappear from view, when the ransomware component of the Computer Agent 24 is uninstalled or Canary files are dynamically disabled using a command line utility. A second benefit is the randomness in file attributes, whereby the Kernel Driver 24 can configure and modify any file attribute like name, size, extension, data of a virtual file to specifically target ransomwares at run time based on detected malicious activities with the Applications 15. And, again, the data content for a virtual canary file is virtual; there is no memory segment actually allocated to a virtual canary file size. For example, a 4 k canary file does not take up 4 k of memory. And, when the attacker tries to read/write the data, for example, based on the canary file size, the Kernel Driver will generate just enough random data to satisfy the user I/O request. A third benefit is random directory placement, whereby the Kernel Driver 24 can cause virtual canary files to be made and appear anywhere in a directory. This is one technique used to lure and trick ransomware into touching and accessing the virtual canary files first, thereby detracting attention from real physical files. A fourth benefit is the handling of trusted processes, whereby the Kernel Driver 24 does not create canary files for trusted processes, thereby reducing the risk of false positives. A fifth benefit is the targeted flexibility in producing and flocking multiple canary files, whereby the Kernel Driver 24 creates any number of canary files per directory to trap ransomware while it is exploiting these virtual canary files in real-time and diverting attention and access to real physical files that will not be touched at all.

Referring still to FIG. 3, a brief overview of the canary file design flow 40 is presented. When describing high-level method steps 41-43 of the design flow, reference will also be made to previous figures for identifying which numbered components perform what actions in the overall system context. Generally, the design flow 40 occurs in real-time, for instance, when one or more applications 15 in the data-centric system 10 are executing on infrastructure components 30 therein. As one example, consider that the application 15 is an untrusted word processing application running in a container of a virtual machine that includes malware. The steps of the canary file design flow 40 occur responsive to installation or execution of the word processing application, with the goal being, that the Computer Agent 20 detects and mitigates the malware within the application 15 while it is attempting to exploit system vulnerabilities, for example accessing and encryption sensitive data. Steps 41-43 of the architecture represent a method for implementing a canary file design strategy that are individually shown and described ahead in FIGS. 4A-4D with further details.

At step 41, while the malware application 15 is performing a directory enumeration of its host target, the Kernel Driver 24 performs a virtual canary file name insertion, whereby it creates canary file names with other randomized attributes details like canary file size, extension, hidden/non-hidden attribute, and so on. The Kernel Driver 24 adds the canary files in the directory listing during directory query requests associated with the directory enumeration. It makes canary files visible, for example, using OS file system utilities depending on the platform type (e.g., Windows, Unix, Linux, etc.), for instance, to a user/application folder view in file explorer, or directory listing applications. More details for this "Directory enumeration" step are provided ahead in FIG. 4A.

At step 42, while the malware application 15 believes it has successfully enumerated a directory on the attack target machine, it attempts to open a Virtual File. But here, after the canary file has been made visible, and unbeknownst to the attacker, if any attacker tries to open it through file explorer or any application; the Kernel Driver 24 will intervene to handle the open file request, and will then proceed to create the canary file in memory 25. It creates the canary file as a virtual file in memory 25 by creating all relevant file structures to represent the canary as a virtual file in memory. Again though, the size attribute of a canary file (e.g. 4 KB) is merely virtual; the process does not allocate a memory segment or block for 4 KB for the virtual canary file. More details for this "Opening a Virtual File" step are provided ahead in FIG. 4B.

At step 43, responsive to malware application 15 believing it has successfully opened a file on an enumerated directory, and attempting to now read content from the file, the Kernel Driver 24 again steps in to intervene. Here, it generates random data and inserts it into the virtual canary file with a known globally unique identifier (GUID) stored in every sector sized block of the memory 25. Every time canary file is opened to read, the data will be random. More details for this "Reading a Virtual File" step are provided ahead in FIG. 4C. Again for example, a certain canary file size does not take up that certain size of memory. And, when the attacker tries to read/write the data, for example, based on the canary file size, the Kernel Driver will generate just enough random data to satisfy the user I/O request.

Briefly, the Computer Agent 20 technically enables the canary file design flow 40 and respective method steps 41-43. More specifically, the Kernel Driver 24 queries the attributes of physical files in an existing folder to mimic the attributes of a virtual file. The Kernel Driver 24 creates the necessary in-memory structures needed to represent a file in the memory 25 and allows all file system operations on these files. These operations are completed by Kernel Driver 24, but these requests are not sent to the storage device, such as the hard disc. When an application 15 enumerates the file system, these virtual files appear as real documents to the application, but which are inserted at random locations in the application directory space. The Kernel Driver 24 also controls the various attributes of a file depending on the perceived trust of the process, type of malware attack, or user trying to access the files. Because of the virtual nature of the files, The Kernel Driver 24 can dynamically modify the file size, name, data, and various attributes of a file. It can dynamically disable and enable Canary files on a per-process basis.

Figure 4A:
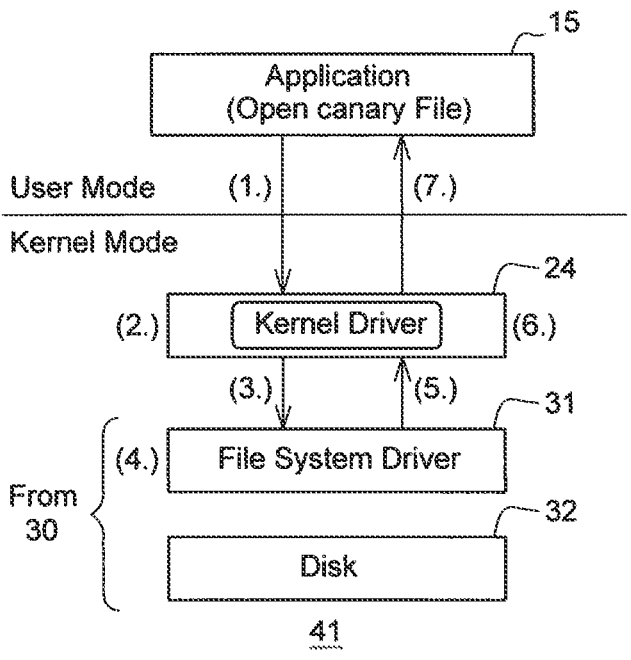
FIG. 4A is a sequence diagram for architecture components of FIG. 3 related to directory enumeration in response to directory query requests from an application in accordance with embodiments.

FIG. 4A is a sequence diagram for architecture components of FIG. 3 related to directory enumeration in response to directory query requests from an application. This is associated with the Virtual Canary file names insertion step 41 of FIG. 3. The Kernel Driver 24 is a Layered Filter Driver, wherein all commands that are sent by the application 15 and destined for the File System and associated driver 31 are intercepted. It registers callback routines when the driver loads. The Directory Query callback is one of these registered callbacks, which occurs responsive to the Kernel Driver 24 detecting a directory enumeration request. Steps 1-7 follow when Kernel Driver 24 receives a directory query request for a directory path.

At step 1, the application 15 issues a request to query a directory on a filesystem. This request will generally include a buffer and a command type. In step 2, the Kernel Driver 24 uses a pre-registered callback to intercept this request before it is passed to the filesystem and its driver 31. The Kernel Driver 24 will attempt to determine if the buffer given by the application is large enough to store the extra canary file names that need to be inserted into the query. If the buffer is large enough, the buffer size is reduced by the amount required.

At step 3, the request is finally passed down to the filesystem to its driver 31. At step 4, the filesystem attempts to fulfill the directory query request. It will put as many file names as it can fit into the buffer. If the filesystem can fit all the names into the buffer, it will indicate via status that it has no more names left to return.

In step 5, the filesystem will attempt to send the request back to the user. The request will be intercepted again by the Kernel Driver 24 before it returns to the user. The Kernel Driver 24 will then generate new Canary entries at step 6 using the Canary file name, size, and extension for multiple Canary files as per specified by canary configuration. Based on the canary index settings, the location where canary file will be inserted is determined. The Kernel Driver 24 will then shift the buffer down at this location to make room for the new Canary entries. At step 7, the directory request is returned to the user, which now contains a mixture of both real file names and Canary file names.

The logic described in steps 1-7 will then be repeated until the Filesystem has given back every file name in the directory and returned the appropriate status to indicate this. This way, canary files will be added in directory listing which will now enlist canary files along with physical files present on disk and user will not know that these canary files are virtual and do not exist on disk and we will take advantage of these virtual files to trap and prevent ransomware attacks.

Figure 4B:
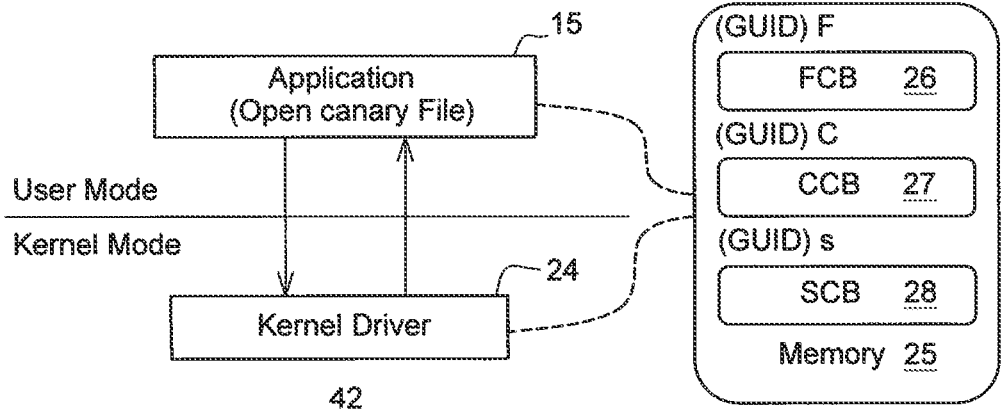
FIG. 4B is a sequence diagram for architecture components of FIG. 3 related to creation of a canary as a virtual file in memory in response to an application opening a virtual file in accordance with embodiments.

FIG. 4B is a sequence diagram for architecture components of FIG. 3 related to creation of a canary as a virtual file in memory in response to an application opening a virtual file. This is associated with the canary file "open" step 42 of FIG. 3. The Kernel Driver 24 includes a layered file system (LFS) filter driver that handles file open requests for physical files as well as virtual files. But, virtual file IO operations between the Application 15 and Kernel Driver 24 are handled differently than physical files which exists on disk.

With the layered file system design, these special canary files will be treated as owned virtual files. The Kernel Driver 24 will own, initialize, and maintain file object and other relevant file representation structures in file system for these canary files and all open requests will not be sent down below Kernel Driver 24 driver in file system stack. It also creates its own handling routine, as mentioned previously with the registered callbacks.

The Kernel Driver 24 identifies the canary file, and then creates a file representation structure for the canary file. It tags canary files as virtual files with a unique flag set, and then completes a canary file open request, such that the application 15 believes it has accessed and open a real file, although, in practice, the request has been mimicked, and no requests were actually sent down to the file system. No real physical files on disk or on a storage device were touched. More generally, when any application 15 opens a canary file which has already been inserted during directory listing in step1, it sends an open request to Kernel Driver 24. The Kernel Driver 24 intercepts this open request and treats this canary file as a type of virtual file as follows. In first validates canary file name in this open request with canary file name list that was created during directory listing. It then allocates memory for File Control Block (FCB) 26, Change Control Block (CCB) 27, Stream Control Block (SCB) 28 which are file representation structures in memory 25 and fills unique signature for identification and other valid details. Again though, these blocks are for the canary file appearance and attributes from the attackers perspective. The actual size attribute of a canary file (e.g. 4 KB) is merely virtual; the process does not allocate a memory segment or block for 4 KB for the virtual canary file.

In some embodiments, the Kernel Driver 24 writes data with predetermined patterns at known write offsets in the Virtual Canary Files, and upon detecting a data overwrite at the offset, triggers a ransomware event, whereby the Kernel Driver dynamically changes one or more among: how many Virtual Canary Files are created, a sequencing order for an enumeration process of the Virtual Canary Files; attributes of Virtual Canary Files, including one or more among a name, size, label, visible type, a hidden type, and data therein; and placement of Virtual Canary Files at random locations in the memory.

Briefly, when a canary file is opened to read then Kernel Driver 24 will intercept this read request for canary file and will create random alphanumeric data of random file size with known Globally Unique Identifier (GUID) inserted in each sector length. This GUID will be referred during canary writes to identify if this is a malicious write or any backup/restore tool triggered write. Thereafter, the Kernel Driver 24 completes this open request to sends this request back to upper-level drivers in file system stack, although lower-level drivers in file system stack will not be aware about this virtual canary file. Hence, this canary file is a virtual file that does not consume any disk space.

FIG. 4C is a sequence diagram for architecture components of FIG. 3 depicting steps of a trusted application associated with an Input/Output request 46 for real physical files in accordance with embodiments. This is associated with the canary file "read" step 43 of FIG. 3. Again, the Kernel Driver 24 is a layered file system minifilter driver that handles file open requests for physical files as well as virtual files, but virtual file IO operations 47 are handled differently than physical file IO operations 46 which exists on disk. With respect to the handling of I/O requests 46 for real physical files, when any application opens, creates, reads, writes, or deletes any real file (which exists on disk), those requests are intercepted by the Kernel Driver 24. The Kernel Driver 24 passes this request to the filesystem driver 31 which will fill in details about real physical files in output buffer. The filesystem driver 31 then passes that back to Kernel Driver 24 which will send the output with a response back to application 15. Here, requests are sent down the file system stack as seen by the "open" label in FIG. 4C.

FIG. 4D is a sequence diagram for architecture components of FIG. 3 depicting steps of an untrusted application associated with an Input/Output request 47 for virtual canary files in accordance with embodiments. This is also associated with the canary file "read" step 43 of FIG. 3. With respect to the handling of I/O requests 57 for virtual canary files, when any application opens, creates, reads, writes, or deletes any virtual file then those requests are intercepted by the Kernel Driver 24. The Kernel Driver 24 will prepare an output buffer for the corresponding read request and passes back to application. Here however, no virtual file related requests will be sent down to the file system driver 31 in file system stack as seen by the "closed" label in FIG. 4D with intentionally missing arrows showing no lower stack communication.

Together FIGS. 4C and 4D illustrate a Hard Disk 32 for storing Real Physical Files a File System Driver 31 for reading and writing the Real Physical Files to the Hard Disk 32; a Kernel Driver 24 situated between the File System Driver and an Application 15 for responding to file access requests to the Hard Disk by the Application 15; and dynamically creating Virtual Canary Files in a memory 25 that is separate from the Hard Disk 32 responsive to the file access requests. Here, the Kernel Driver 24 controls file system operations 46, 47, including I/O events for the reading and writing, to the Virtual Canary Files to dynamically detect whether the Application 15 is ransomware, and mitigate ransoming of the Real Physical Files, without sending file access requests to the storage device, whereby ransomware attacks are detected early without losing customer data, without polluting the customer's file system or consuming additional space on a storage device of the Hard Disk, and wherein the Computer Agent is deployed or installed to execute on one among a system 10 with infrastructure components 30 for Big Data, Containers, Cloud, Databases and File Servers.

FIG. 5 depicts an example of dynamic modification and configuration of virtual canary files in memory via the Kernel Driver 24 on a per process basis 50 in response to an application reading file data in accordance with embodiments. Here, two example processes are considered: a higher trust Process A (53), and a lower trust Process B (54). The Kernel Driver controls various attributes (51, 52) of the real documents responsive to identifying: a perceived trust level (53, 54) of a process associated with the Application (15), wherein the Kernel Driver hides or makes visible Virtual Canary Files (55, 56) according to the perceived trust level (53, 54)

Here, a directory query result presented by Kernel Driver 24 is shown for two different processes of the same directory "C: \example". Other directories and file shares are contemplated and supported. In this example, Process A is associated with file access of a .ppt file designation, and Process B is associated with file access of a .docx file designation. In this example, Process A is inserting a single Canary file at index one (=1), and Process B is inserting two more 56 canary files at index two (=2). The Kernel Driver 24 can create more Virtual Canary Files 56 in real-time upon detection of ransomware activities with respect to existing Virtual Canary Files, thereby trapping ransomware exploits and mitigating access to the Real Physical Files. This is also why the canary files seen by different applications, processes and threads vary, and how file modification and control is performed on a per process basis 50.

Kernel Driver 24 achieves this by controlling placement of canary file names and entries within a provided directory enumeration list. Here, as can be seen in FIG. 5, the Filename_A.txt and all file name entries below are shifted down to accommodate Canary_A.ppt. Note that file extension (e.g., ppt, doc, etc.) and various file attributes 51 such as size and timestamp (represented by attributes A, B and C) are configured from settings in the process A context. Process B 54 has been perceived to have lower trust than Process A 53, therefore two Canaries will be placed in the directory Query. Because Filename_B.txt is below index 2 it must be shifted down to accommodate two canary file names, Canary_B.docx and Canary_C.docx. Again, the file extension and file size are also configured by the Kernel Driver 24 according to the process B context.

Briefly, the application, such as the .doc or .ppt program, consists of one or more processes executing on a processor, such as a central processing unit (CPU). In order for the CPU to run the application, the Operating System (OS) loads the program's instructions and data into system memory (e.g., RAM, memory 25). The OS stores in memory 25 the address space contents from many processes and code that it will map into every process's virtual address space. Virtual memory is the per-process view of its memory space, and virtual addresses are addresses in the process's view of its memory. The process is given its own address space, which allows each process to have its own stack and heap independent of the other processes. A single process can also run multiple threads all sharing the same address space, though each thread still each have their own stack. This operational state of the CPU as managed by the OS, including the instructions and data, is known as the process context. It contains all the information about the current state of the CPU that the OS requires for successful execution of the process. The Kernel Driver 24, because it resides in kernel space and operates in kernel mode, is privileged to obtain information on the process context. This is why the Kernel Driver 24 can intervene during various system calls like open, read, write and close to modify and configure virtual canary files when the kernel is executing on behalf of a particular process.

The Kernel Driver 24 controls various attributes (51, 52) of the Virtual Canary Files (55, 56) presented as real documents amongst other physical real files of a Process (A, B) responsive to detecting a type of malware attack associated with the Application 15; and a user trying to access the real documents and other physical real files. Virtual canary files are randomized using dynamic configurable options in order to create randomized canary virtual files that intentionally trap unknown ransomware with unknown behavior. The Kernel Driver 24 also applies the randomization to canary file location. In the Process A example, in directory listing, virtual canary file is configured to place it at 1st index, but could be applied to the middle or at the end of existing files as seen by Process B. The randomization is also applied to the canary filename. The Kernel Driver 24 controls the presentation of the directory enumeration list returned by the file system is in alphabetical order. This allows it to control ordering on where a file is inserted in the list randomly. Otherwise, if it did not select the appropriate name, it would appear to be out of order in the list. For this reason, the Kernel Driver 24 can create an appropriate canary name like temp_0001.txt to appear in the correct order.

Recall from FIGS. 4C-4D, the step of controlling file system operations (46, 47) comprises querying attributes of the Real Physical Files in a Folder Directory represented by the Hard Disk; mimicking the attributes (51, 52) of the Real Physical Files to the Virtual Canary Files in the memory 25; creating in-memory structures (26, 27, 28) shown in FIG. 4B that represent the Virtual Canary Files and corresponding attributes as Real Physical Files in the Hard Disk 32 to the Application 15; and dynamically changing the attributes (51, 52) of the Virtual Canary Files by way of the in-memory structures in real-time to target ransomware at run-time; wherein the attributes (51, 52) of the Virtual Canary Files are selected from one or more among a name, size, extension, and data or other property or characteristic of the Real Physical Files.

The Kernel Driver controls (46, 47) file open, read, write and delete request so as to present the Virtual Canary Files (55, 56) as real documents amongst other physical real files of a Process (A, B) to the Application (15) responsive to the Application enumerating a file system of the Hard Disk. It controls enumeration behavior of the file system of the Hard Disk 32 and inserts the Virtual Canary Files (55, 56) at random locations in the Folder Directory amongst other physical real files of Process A and B. This allows it to dynamically disables and enables the Virtual Canary Files (55, 56) on a per-process basis (50), such that the Virtual Canary Files differ between applications, threads and processes with respect to their location, property, size, content, or characteristics.

The Kernel Driver 24 controls file data of a canary by creating random file size data with random alphanumeric wide characters that are stored in canary file. It also stores a predetermined GUID, for example of size 76 bytes, after every sector size to make a distinguishable owned canary file. This is what allows the Kernel Driver 24 to identify when an attacker is accessing or modifying data, because it knows the process would not otherwise use that data. The Kernel Driver 24 can also create multiple canary files 56 per directory as additional baits, so that ransomware tries to manipulate these canary files and becomes trapped thereby preventing real data file access. The Kernel Driver 24 also controls file attributes (51, 52) of canary files, thereby providing flexibility to hide canary files form any process like a file explorer program or command line utility. The Kernel Driver 24 also considers exempted and trusted process. For known trusted processes, canary files will not be created to avoid false positives. An example of a trusted process is one whose signature has been verified, for example, via standard Public Key Infrastructure (PKI) utilities, or validated through a chain or trust procedure, or other external provider, such as an identify provider service, attestation or other trust process.

Figure 6:
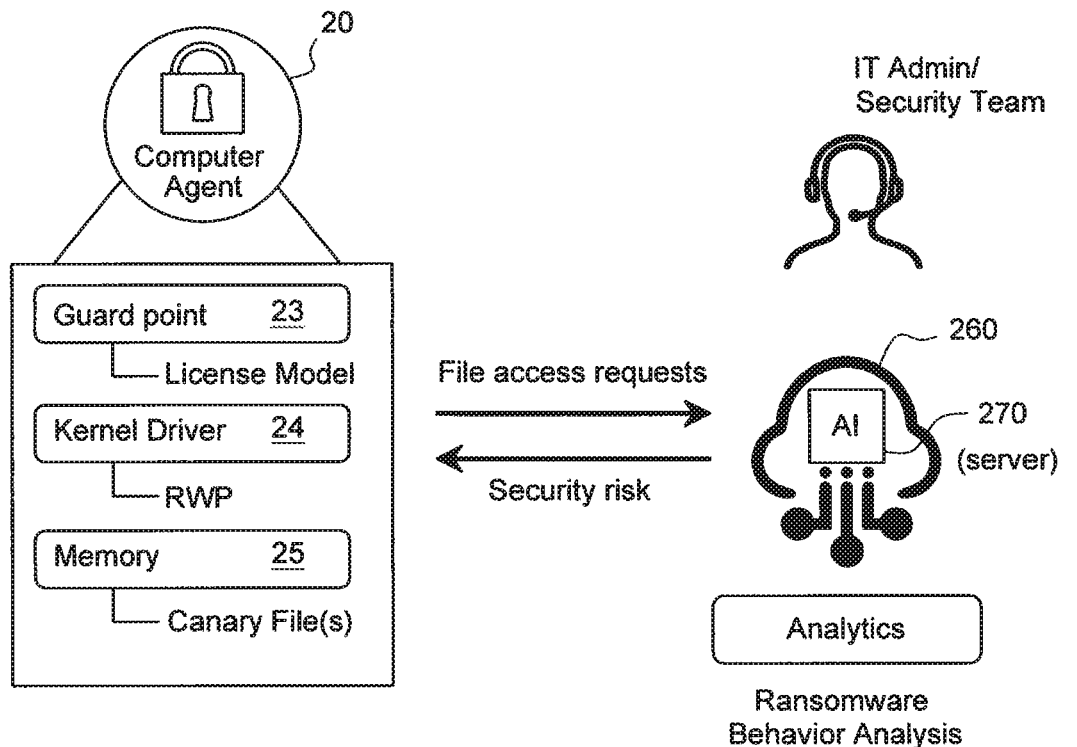
FIG. 6 further depicts a Guard Point with an adaptive License Model, an artificial intelligence module to learn a behavior of the ransomware, and an alert mechanism Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

Referring to FIG. 6, the Computer Agent 20 can further comprise a Guard Point 23 with an adaptive License Model. The Guard Point 23 is a device or directory to which a data protection and encryption policy has been applied. It can also be a share mounted on multiple systems, for example, via a Network File Share (NFS). The adaptive license model provides for dynamic flexing of virtual canary files on the Guard Point 23 to detect and prevent ransomware attacks thereon. The guard point 23 is applied at a volume level which will create random canary virtual files as per canary configurations in all subdirectories. Here, the assigned volume label allows users to recognize the volume by a custom name, whereas a drive letter is assigned automatically by the operating system.

A ransomware protection package (RWP) of the license model 17 receives predetermined options for guarded directories and devices to configure an automatic adaptability for virtual canary file deployment according to terms and conditions of a license; a license usage collection module coupled to the license design module, to collect real-time usage canary file use and user interaction of licensed software against ransomware and other applications under the license; and a license analyzer module coupled to the license usage collection module for analyzing real-time canary file activity, access and interaction, and therefrom identifying patterns and trends of licensed features of the licensed software under the license according to said license model.

In such cases, when any malicious process opens canary file, that request is passed to RWP of the Kernel Driver 24, it will create virtual file representation structures for that canary file in memory and mark it as a known canary virtual file. Any read operation for that canary will produce a random alphanumeric character with known GUID at known offset in each sector length data, because those unique identifiers and labels were created with the canary file. Thus, if any process tries to write data in canary, delete canary file, rename canary file, truncate canary data, then that process will be flagged as malicious, and that operation will be returned access denied. It is considered malicious because there would be no reason for a process to use that file since it was created and flagged as a known canary file for baiting malicious applications. Next time, any file open by that process (now considered malicious) will be access denied immediately and blocked. This way, if any ransomware process attacks any canary file at any sub-directory level, then the Kernel Driver 24 will block that access request, and any real user data file will not be compromised.

The RWP of the Kernel Driver 24, can also operate in conjunction with a server 260 that uses artificial intelligence (AI) module 270. The RWP and sever 270 maintain a history of ransomware detections and make improved security risks assessments over time on the guarded point 23, and in accordance with the License Model. The remote AI module 270 by way of licensed features can adjust the RWP for certain applications or users. In practice, the Kernel Drivers changes one among a location, property, size, content, characteristic or attribute (51, 52) of a Canary File (55, 56) and uses an artificial intelligence module 270 or generative artificial intelligence module to learn a behavior of the ransomware. As previously mentioned, canary locations, sizes, and other file attributes can be dynamically configured based on what is learned about ransomware attacks on a per process basis (as shown in FIG. 5). This also provides an alert mechanism based on a learned event threat analysis, which can be made visible to system administrators and a security team, thereby presenting events related to user and attacker interactions In another embodiment the RWP can ask for simple risk score guidance from server 260, such as OWASP vulnerabilities, such as SQL invention, insecure APIs and inadequate access controls, in conjunction with the AI module 270. In such configuration, the Computer Agent 20, can dynamically change the properties, size, attributes, and characteristics of licensed canary files to learn the behavior of various ransomware and detect its polymorphic nature. As one example, the Licensing Model can lease a database as a guard point to evaluate and learn how the ransomware interacts with it via the AI module 270, and then report on the ransomware behavior and baiting quality and lure of the virtual canary files.

The coupling of the Kernel Driver 24 with Guard Point 23 and corresponding Ransomware Protection (RWP) license mode and virtual canary files provides live, real-time detection and prevention of ransomware attacks early without losing customer data, without polluting the customer's file system or consuming any space on a storage device. It prevents malicious processes from encrypting or destroying sensitive data, stops exfiltration of sensitive data and protects data from various Advanced Persistent Threats (APT), ransomware, and malicious scripts attacks. The RWP license module analyzes data access at the specified guard point 23 in real time and presents a ransomware risk score. It calculates an entropy value of data to determine if a potentially malicious application is encrypting, destroying, or stealing data. During live analysis, it can also learn behavior of ransomware, and revise the risk score where there is a risk that sensitive files may be encrypted or destroyed by the attack. This additionally prevents any files from being encrypted or destroyed by an attack during live analysis. This enhancement ensures that no data is lost while live data analysis is in progress, with the goal of achieving zero data loss.

Advantages and benefits of the embodiments herein provision trusted processes differently from untrusted processes, where canary files will not be created for trusted processes to reduce the risk of false positives. For untrusted processes, canary files are visible or hidden depending on the perceived trust level of a process. Also, herein, any number of canary files can be created per directory so that ransomware gets trapped while exploiting these virtual canary files and real files will not be touched at all. This innovation allows the control of enumeration behavior of the file system. The innovation can insert these files at any random location in a directory. And, if the same storage is mounted on a different system, the applications or users, on that system will see totally different characteristics of the files.

The Computer Agent 20 and associated modules can include one or more processors and memory coupled to the one or more processors, wherein the memory includes computer instructions which when executed by the one or more processors causes the one or more processors to perform the method steps and operations described. They may be connected over the network to other machines via a network communication device interface. Dedicated hardware implementations including, but not limited to, application specific integrated circuits, programmable logic arrays and other hardware devices can likewise be constructed to implement the systems, devices and methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor or integrated on-chip code within static memory. Furthermore, software implementations can include, but not limited to, distributed processing or component/object distributed processing, parallel processing, or virtual machine processing can also be constructed to implement the methods described herein.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A Computer Agent to detect and mitigate ransomware attacks, configured to perform on one or more processors and memory coupled to the one or more processors, wherein the memory includes one or more partitions and computer instructions which when executed by the one or more processors causes the one or more processors to perform operations via:

a Hard Disk for
    storing Real Physical Files a File System Driver for
    opening, reading and writing the Real Physical Files to the Hard Disk;

a Kernel Driver situated between the File System Driver and an Application for
    responding to file access requests to the Hard Disk by the Application;
    dynamically creating Virtual Canary Files in a memory that is physical Random Access Memory (RAM) or virtual memory separate from the Hard Disk responsive to the file access requests;
    controlling file system operations, including I/O events for the reading and writing, to the Virtual Canary Files to dynamically detect whether the Application is ransomware, and mitigate ransoming of the Real Physical Files, without sending file access requests to the storage device by
    creating in-memory structures that represent the Virtual Canary Files and attributes as Real Physical Files in the Hard Disk to the Application;
    dynamically changing the attributes of the Virtual Canary Files by way of the in-memory structures in real-time to target ransomware at run-time, wherein the Kernel Driver is hooked into the File System Driver using a Layered File System (LFS) model that virtualizes file properties of the Virtual Canary Files to filter a directory query, intercept a filename list from the directory query, and dynamically add Virtual Canary Files to the filename list,
    whereby ransomware attacks are detected early without losing customer data, without polluting the customer's file system or consuming additional space on a storage device of the Hard Disk,
    wherein the Computer Agent is deployed or installed to execute on one among a system with infrastructure components for Big Data, Containers, Cloud, Databases and File Servers.

2. The Computer Agent of claim 1, wherein the step of controlling file system operations comprises:
    querying the attributes of the Real Physical Files in a Folder Directory represented by the Hard Disk;
    mimicking the attributes of the Real Physical Files to the Virtual Canary Files in the memory;
    wherein the attributes of the Virtual Canary Files are selected from one or more among a name, size, extension, and data or other property or characteristic of the Real Physical Files.

3. The Computer Agent of claim 1, wherein the Kernel Driver via the Layered File System (LFS) model in kernel mode controls file open, read, write and delete requests so as to present the Virtual Canary Files as real documents amongst other physical real files of a Process (A, B) to the Application responsive to the Application enumerating a file system of the Hard Disk.

4. The Computer Agent of claim 1, whereby the Kernel Driver via the Layered File System (LFS) in kernel mode controls enumeration behavior of the file system of the Hard Disk and inserts the Virtual Canary Files at random locations in the Folder Directory amongst other physical real files of a Process (A, B).

5. The Computer Agent of claim 1, wherein the Kernel Driver via the Layered File System (LFS) controls various virtualized attributes of the Virtual Canary Files presented as real documents amongst other physical real files of a Process (A, B) responsive to detecting:
    a type of malware attack associated with the Application; and
    a user trying to access the real documents and other physical real files.

6. The Computer Agent of claim 2, wherein the Kernel Driver controls various attributes of the real documents responsive to identifying:
    a perceived trust level of a process associated with the Application,
wherein the Kernel Driver hides or makes visible Virtual Canary Files according to the perceived trust level.

7. The Computer Agent of claim 3, wherein the Kernel Driver dynamically disables and enables the Virtual Canary Files on a per-process basis, such that the Virtual Canary Files differ between applications, threads and processes with respect to their location, property, size, content, or characteristics.

8. The Computer Agent of claim 6, wherein the Kernel Driver creates more Virtual Canary Files in real-time upon detection of ransomware activities, thereby trapping ransomware exploits and mitigating access to the Real Physical Files.

9. The Computer Agent of claim 7, wherein the Kernel Drivers changes one among a location, property, size, content, characteristic or attribute of a Canary File and uses an artificial intelligence module or generative artificial intelligence module to learn a behavior of the ransomware.

10. The Computer Agent of claim 1, wherein the Kernel Driver writes data with predetermined patterns at known write offsets in the Virtual Canary Files, and upon detecting a data overwrite at the offset, triggers a ransomware event, whereby the Kernel Driver dynamically changes one or more among:

how many Virtual Canary Files are created, sequencing order for an enumeration process of the Virtual Canary Files;

attributes of Virtual Canary Files, including one or more among a name, size, label, visible type, a hidden type, and data therein; and placement of Virtual Canary Files at random locations in the memory.

11. The Computer Agent of claim 2, wherein in-memory structures are internal structures representing Virtual Canary Files that do reside in virtual memory, though actual contents of the Virtual Canary Files do not reside in virtual memory, such that the Virtual Canary Files do not consume a large amount of memory.

12. A method for a Kernel Driver situated between the File System Driver and an Application to detect and mitigate ransomware attacks comprising steps of:

storing Real Physical Files via a Hard Disk;

opening, reading and writing the Real Physical Files to the Hard Disk a File System Driver;

responding to file access requests to the Hard Disk by the Application;

dynamically creating Virtual Canary Files in a memory that is physical Random Access Memory (RAM) or virtual memory separate from the Hard Disk responsive to the file access requests;

controlling file system operations, including I/O events for the reading and writing, to the Virtual Canary Files to dynamically detect whether the Application is ransomware, and mitigate ransoming of the Real Physical Files, without sending file access requests to the storage device by

22 creating in-memory structures that represent the Virtual Canary Files and attributes as Real Physical Files in the Hard Disk to the Application;

dynamically changing the attributes of the Virtual Canary Files by way of the in-memory structures in real-time to target ransomware at run-time, wherein the Kernel Driver is hooked into the File System Driver using a Layered File System (LFS) model that virtualizes file properties of the Virtual Canary Files to filter a directory query, intercept a filename list from the directory query, and dynamically add Virtual Canary Files to the filename list, whereby ransomware attacks are detected early without losing customer data, without polluting the customer's file system or consuming additional space on a storage device of the Hard Disk, wherein the Kernel Driver is deployed or installed to execute on a Computer Agent among a system with infrastructure components for Big Data, Containers, Cloud, Databases and File Servers.

13. The method of claim 12, wherein the step of controlling file system operations comprises:

querying the attributes of the Real Physical Files in a Folder Directory represented by the Hard Disk;

mimicking the attributes of the Real Physical Files to the Virtual Canary Files in the memory;

wherein the attributes of the Virtual Canary Files are selected from one or more among a name, size, extension, and data or other property or characteristic of the Real Physical Files, wherein the in-memory structures are internal structures representing Virtual Canary Files that do reside in virtual memory, though actual contents of the Virtual Canary Files do not reside in virtual memory, such that the Virtual Canary Files do not consume a large amount of memory.

* * * * *